Feb. 7, 1967 L. STASCHOVER ETAL 3,303,423
THERMOCOUPLE TYPE R.M.S. MEASURING SYSTEM HAVING
STORAGE MEANS TO HOLD MEASURED SIGNAL
FOR COMPARISON WITH REFERENCE
Filed July 12, 1963 2 Sheets-Sheet 1

INVENTORS
LEO STASCHOVER
BY CHARLES I. CIMILLUCA

Alfred W. Barber
ATTORNEY

Feb. 7, 1967 L. STASCHOVER ETAL 3,303,423
THERMOCOUPLE TYPE R.M.S. MEASURING SYSTEM HAVING
STORAGE MEANS TO HOLD MEASURED SIGNAL
FOR COMPARISON WITH REFERENCE
Filed July 12, 1963 2 Sheets-Sheet 2

INVENTORS
LEO STASCHOVER
BY CHARLES I. CIMILLUCA

Alfred W. Barber
ATTORNEY

United States Patent Office 3,303,423
Patented Feb. 7, 1967

3,303,423
THERMOCOUPLE TYPE R.M.S. MEASURING SYSTEM HAVING STORAGE MEANS TO HOLD MEASURED SIGNAL FOR COMPARISON WITH REFERENCE
Leo Staschover, Syosset, and Charles I. Cimilluca, Bronx, N.Y., assignors to North Hills Electronics, Inc., Glen Cove, N.Y., a corporation of New York
Filed July 12, 1963, Ser. No. 294,597
6 Claims. (Cl. 324—106)

The present invention concerns methods of and means for making and monitoring true R.M.S. measurements of alternating current voltages.

The common method of A.C. voltage measurement on a true R.M.S basis involves the use of a vacuum thermocouple as the transfer element between the unknown and an accurately known D.C. voltage. A simplified diagram of this method is shown in FIGURE 1. With transfer switch in the A.C. position, the series resistance current control is adjusted to allow a nominal current level, generally in the 1 to 10 ma. range, to flow through the thermocouple heater. The uncalibrated potentiometer is then adjusted to a level equal to the D.C. voltage of the thermocouple output, as indicated by a null on galvanometer G. Without disturbing the current control adjustment, the transfer switch is then connected to the calibrated D.C. source whose output is adjusted to again obtain a galvanometer null. This D.C. voltage is then equal to the R.M.S. value of the A.C. input by virtue of the fact that both produce the same heating effect in the thermocouple heater element. At audio frequencies, the accuracy of the comparison is governed by the residual A.C. reactances present in the current adjustment resistor and the transfer and reversal errors of the thermocouple.

By replacing the galvanometer with a high gain D.C. amplifier and strip chart recorder, the system may be used to monitor changes in the A.C. input voltage. However, drift with temperature and time in the vacuum thermocouple characteristics and to a lesser extent, the current control resistor, make it necessary to switch back periodically to the D.C. input and readjust the uncalibrated potentiometer for a galvanometer null.

Although based on the thermal transfer principle, operation of the present invention is far more convenient than the prior art system as shown in FIG. 1. In accordance with the present invention, a function switch permits rapid measurement and setting of the A.C. voltage level, dispensing with the need for adjustment of an uncalibrated potentiometer. Also, the present invention provides for automatically standardizing to the D.C. reference at selectable predetermined intervals.

Accordingly, one object of the present invention is to provide a method of and means for making true R.M.S. alternating current voltage measurements in a simplified manner and to a high degree of accuracy.

Another object is to provide automatic standardization of true R.M.S. alternating current voltage measurements.

Still another object is to provide periodic automatic standardization of true R.M.S. alternating current voltage measurements.

A further object is to provide adjustment means for periodic automatic standardization of true R.M.S. alternating current voltage measurements in order to provide monitoring of sources over a wide range of stability characteristics.

These and other objects of the present invention will be apparent from the following specification taken in connection with the various figures of the drawing.

In the drawing:
FIGURE 1 is a typical circuit of the prior art.

Figure 1:
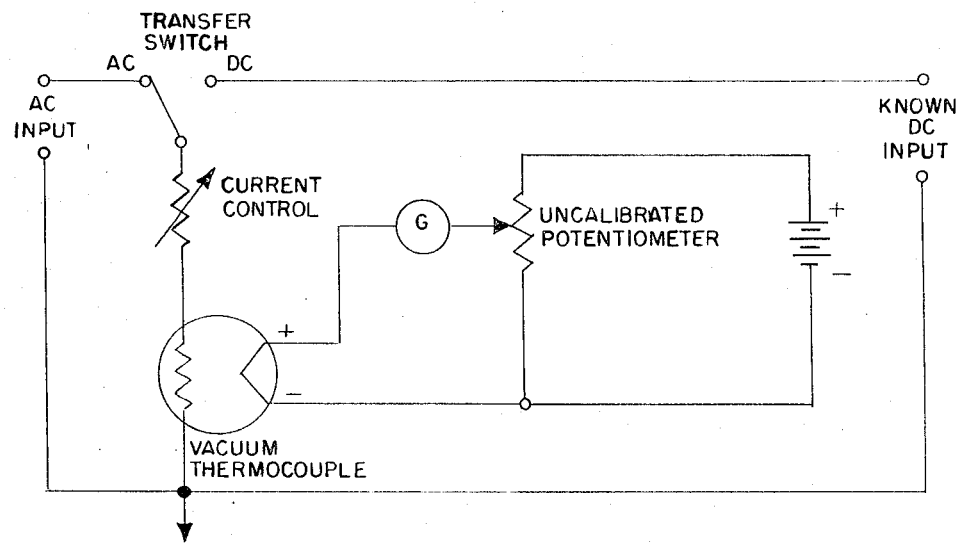
Figure 2:
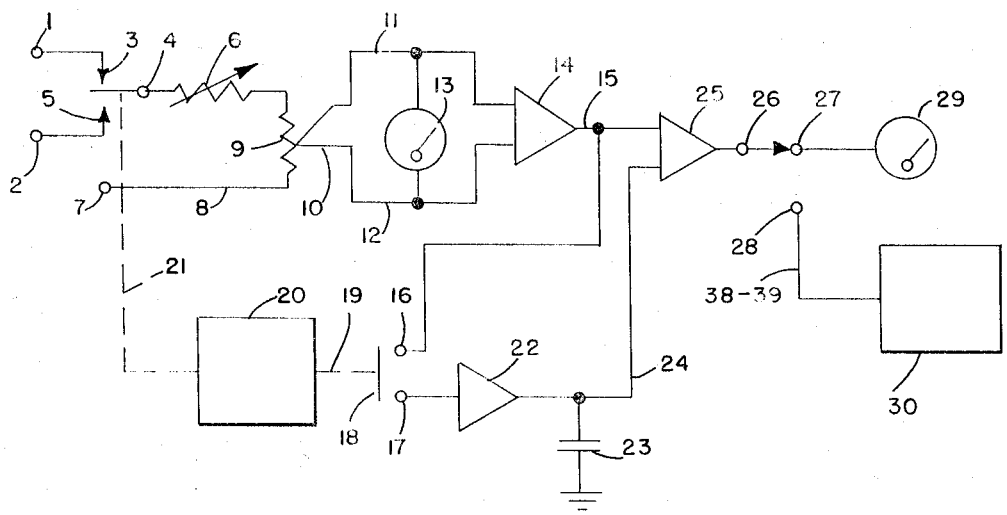
FIGURE 2 is a simplified block diagram of one form of the present invention.

FIG. 2 is a simplified block diagram of one form of the present invention showing input terminals 1 and 2 to which an input to be monitored and a reference voltage are to be connected respectively. Switch 3-4-5 permits connecting either input terminal to terminal 4 and through current control resistor 6, thermocouple heater 9 and over lead 8 to return terminal 7. In operation, an input to be monitored is connected between terminals 1 and 7, terminal 4 is switched to 3 and resistor 6 is varied until a convenient reading is obtained on the current meter 13 connected across thermocouple junction 10 by means of leads 11 and 12. The D.C. drop across the thermocouple is amplified by amplifier 14 and is applied over lead 15 to one of the two inputs to differential amplifier 25. Now, if switch 16-17-18 is closed, the output of amplifier 14 is applied to the input of amplifier 22. Now, amplifier 22 is an operational amplifier which practically instantaneously charges capacity 23 to a voltage equal to the input voltage as received from the output of amplifier 14. This voltage developed across capacitor 23 is applied over lead 24 to the second input of differential amplifier 25. Since amplifier 25 is a differential amplifier adapted to provide zero output when two equal inputs are applied, no output will now be produced.

In order to make a comparison, switch 16-17-18 is opened leaving the stored or memory voltage on capacitor 23 and applied to one input of differential amplifier 25; the input switch is shifted so that terminal 4 is connected to input terminal 2; a reference or comparison voltage as one from a voltage regulated power supply is applied to terminal 2; and the voltage of this reference or comparison voltage is adjusted until the output of amplifier 25 is again zero. The determination that the output of amplifier 25 is actually zero may be made, for example, by means of a meter 29 connected through switch 26-27. When the above has been carried out, a determination of the voltage which was applied to terminal 1 has been made and is equal to the voltage applied to input terminal 2. This equality is between the magnitude of two D.C. voltages or a D.C. voltage and the R.M.S. value of an alternating current voltage if one or both are alternating current.

The above described system may be used for monitoring purposes as, for example, for monitoring the drift, with time, of a voltage source. The source to be monitored may be an alternating current source in which case the monitoring will be of the true R.M.S. value of the source. One procedure is to connect the voltage source to be monitored between terminals 1 and 7 and a stable reference voltage source between terminals 2 and 7. Once the above described standardizing procedure has been carried out at the start of a test run, the drift of the monitored source may be found at any time. This is done by switching terminal 4 to the reference voltage source; closing switch 16-17-18 in order to set the memory voltage across capacitor 23; opening switch 16-17-18 whereby the voltage across capacitor 23 remains as a reference at one input to amplifier 25; switching terminal 4 to the monitored input causing a difference voltage proportional to the D.C. or R.M.S. value of difference to appear at the other input to amplifier 25 and an amplified output to appear at meter 29. It will be seen that by this procedure that all drift factors in all components of the system up to the inputs to amplifiers 22 and 25 are cancelled out since common circuit elements are used in the balance of the system. Since amplifiers 22 and 25 are types which are well known in the art to be of very accurate and stable and since the signals may be greatly magnified by amplifier 14, the gain of which is cancelled out by the measuring method and technique, a system capable of extremely accurate comparative measurements is provided.

If it is desired to record the changes in the monitored voltage, a suitable recorder 30 may be provided to which the output of amplifier 25 may be switched by means of switch 26–28 and leads 38–39. In order to make the system operate periodically and automatically, a clock control 20 may be provided which, at predetermined intervals, switches terminal 4 to the reference source; closes switch 16–17–18 is indicated by mechanical links 21 and 19 respectively; opens switch 16–17–18 and switches terminal 4 to the monitored source. The recorder may be connected, stepped or otherwise coordinated by the timing provided by clock 20. The timing sequence may be set in accordance with the rate of drift of the monitored source detail of recording desired etc.

Figure 3:
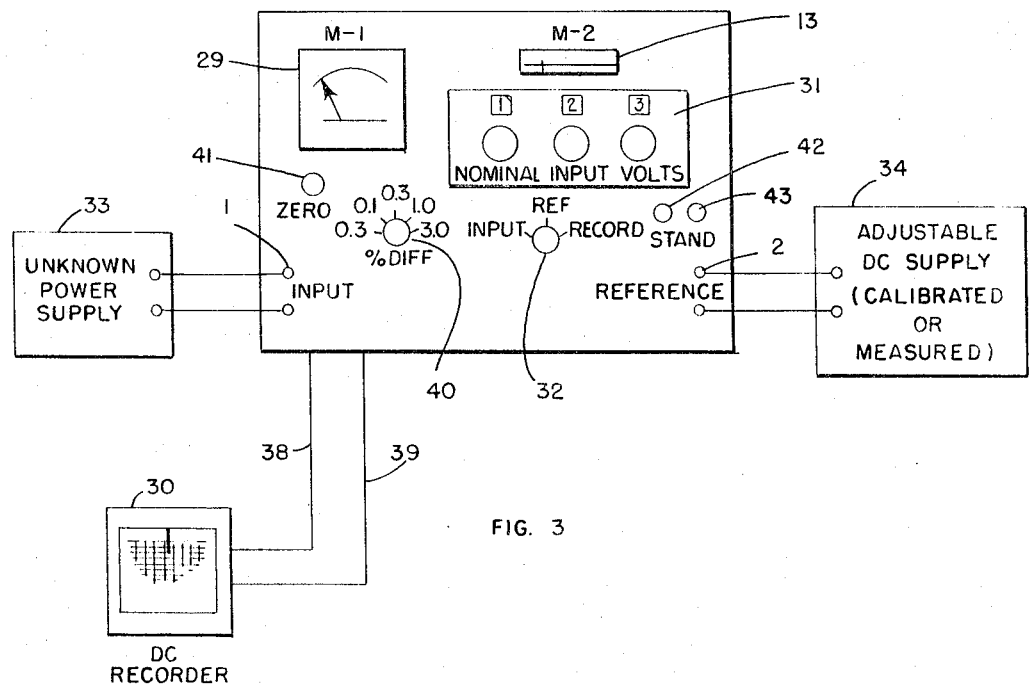
FIGURE 3 is a front panel view of a commercial form of the present invention connected for making a typical comparison measurement.

FIG. 3 is a vew of a commercial form of the present invention connected to record the variations in voltage of an unknown power supply (monitored supply) 33 connected between terminals 1 and 7 as compared to a reference supply 34 connected between terminals 2 and 7' upon a recorder 30 connected over leads 38–39. The numbers designating various components correspond with similarly numbered circuit elements shown in FIG. 2 and described above. The external controls shown include a three decade current control resistance 31 with voltage indications showing nominal input volts which in FIG. 2 appears as current control resistor 6; a function switch 32 which switches input contacts 3–4–5 and in its RECORD position switches the output of amplifier 25 to recorder 30 and turns on programming clock 20; a percent difference switch 40 which varies the sensitivity of the output circuit of amplifier 25 and the timing of the recording intervals and their spacing; and a zero control 41 for initially setting meter 29 to its center zero position. The arrangement shown in FIG. 3 includes an unknown power source 33 connected to input terminal 1 and a reference supply 34 connected to input terminal 2.

Figure 4:
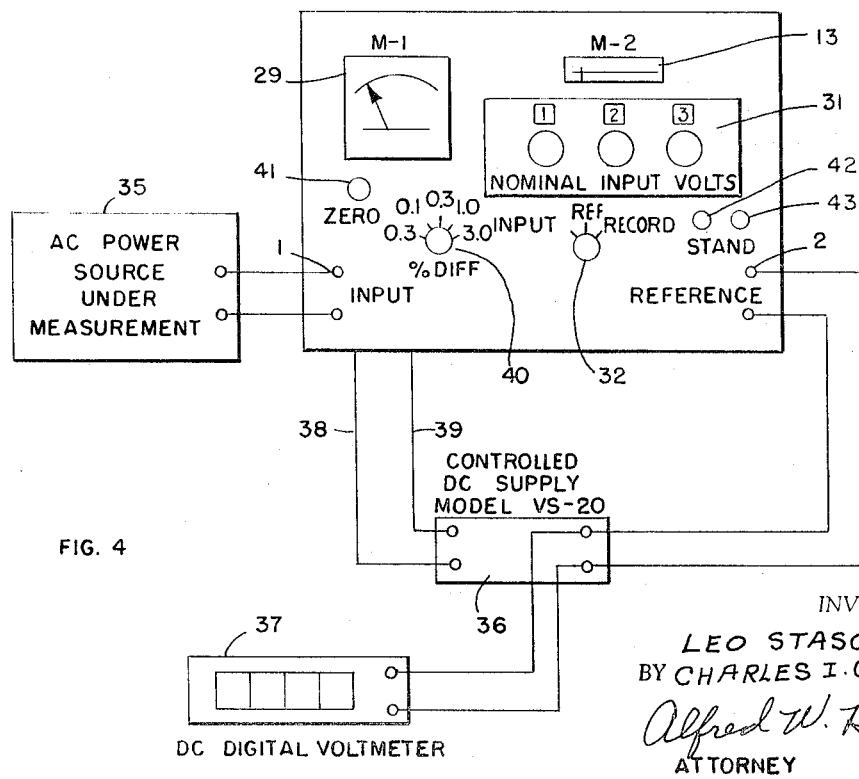
FIGURE 4 is a front panel view of the same commercial form of the present invention as in FIG. 3 but connected for making another type of comparison measurement.

FIG. 4 shows the same commercial form of the present invention connected as a true R.M.S. converter of alternating current to equivalent direct current. Component numbers correspond with those of FIGS. 2 and 3. In this application a source of A.C. power 35 is connected to input terminal 1 and a source of controlled D.C. 36 is connected to input terminal 2 and to recorder leads 38–39. This controlled source, not to be shown in detail, regulates to provide a null across leads 38–39 at which point its output at terminal 2 is equal to the R.M.S. value of the voltage at terminal 1. This equivalent D.C. voltage is indicated on a digital voltmeter 37 connected to terminal 2.

While only one form of the present invention has been shown and described, many modifications will be apparent to those skilled in the art and within the spirit and scope of the invention as set forth in particular in the appended claims.

What is claimed is:
1. In a voltage comparison system, the combination of, a pair of input terminals to be connected to sources of voltage to be compared, a thermocouple including heater means and output means, a first amplifier including input means and output means, a second amplifier including input means and output means of inverted polarity with respect to said input, a third amplifier including a two sided differential input means and output means, current control means connected to said heater, a two position switch for switching said current control means selectively to each of said input terminals to selectively apply said source of voltage through said current control means to said heater, means connecting said thermocouple output means to the input of said first amplifier, a switch which when closed connects the output of said first amplifier to the input of said second amplifier, a capacitor to be charged by signals amplified by said second amplifier connected to its output, mechanical coupling means between said two switches to provide closing of said second switch corresponding with a predetermined position of said first switch so that said capacitor is charged in response to one of said sources of voltage, means connecting one side of said third amplifier input means to the output of said first amplifier and the other side to said capacitor so that the output of said third amplifier is a function of the difference between said two sources of voltage.

2. A voltage comparison system as set forth in claim 1 and including a meter and means for connecting said meter to the output of said third amplifier for indicating the difference between the voltages of said sources.

3. A voltage comparison system as set forth in claim 1 and including a recorder and means for connecting the output of said third amplifier to said recorder for recording the difference between the voltage of said sources.

4. A voltage comparison system as set forth in claim 1 and including timing means connected to said mechanical coupling means to operate said switches at predetermined intervals of time.

5. A voltage comparison system as set forth in claim 1 wherein said current control means is calibrated to indicate nominal input voltage applied to one of said input terminals.

6. A voltage comparison system as set forth in claim 1 and including a current meter connected to said thermocouple.

References Cited by the Examiner
UNITED STATES PATENTS

| | | | |
|---|---|---|---|
| 2,750,547 | 6/1956 | Wannamaker | 324—111 X |
| 2,805,394 | 9/1957 | Hermach | 324—106 |
| 2,860,307 | 11/1958 | Castruccio | 324—130 |

J. J. MULROONEY, *Assistant Examiner.*

WALTER L. CARLSON, *Primary Examiner.*